J. M. HANSEN.
CAR DOOR OPERATING MECHANISM.
APPLICATION FILED APR. 27, 1910.

1,008,460.

Patented Nov. 14, 1911.

2 SHEETS—SHEET 2.

WITNESSES.
J. R. Keller
John F. Will

INVENTOR.
John M. Hansen
By Kay Tottin
atty

UNITED STATES PATENT OFFICE.

JOHN M. HANSEN, OF PITTSBURGH, PENNSYLVANIA.

CAR-DOOR-OPERATING MECHANISM.

1,008,460.  Specification of Letters Patent.  Patented Nov. 14, 1911.

Application filed April 27, 1910. Serial No. 558,030.

*To all whom it may concern:*

Be it known that I, JOHN M. HANSEN, a resident of Pittsburgh, in the county of Allegheny and State of Pennsylvania, have invented a new and useful Improvement in Car-Door-Operating Mechanism; and I do hereby declare the following to be a full, clear, and exact description thereof.

My invention relates to car door operating mechanism, and is especially adapted for combined freight and dump cars, though it is adapted for use with any suitable kind of car doors. Its object is to provide a simple locking connection between the winding shaft and the door independent of the chain, and by which the door may be held positively closed by a short connecting bar extending between the door and the shaft and holding the parts in positive fixed relation.

It consists, generally stated, in the combination with a car body, a hinged door and a rotatable winding shaft journaled in non-movable position on the car body and connected by chains or like means to the door, of a separate locking means between the winding shaft and the door adapted to hold the door closed independent of the chain, such as a hooking or cam block on the shaft engaging with a bar carried by the door and adapted to hold the door in positive closed position.

It also includes other improvements as hereafter set forth and claimed.

Figure 1:
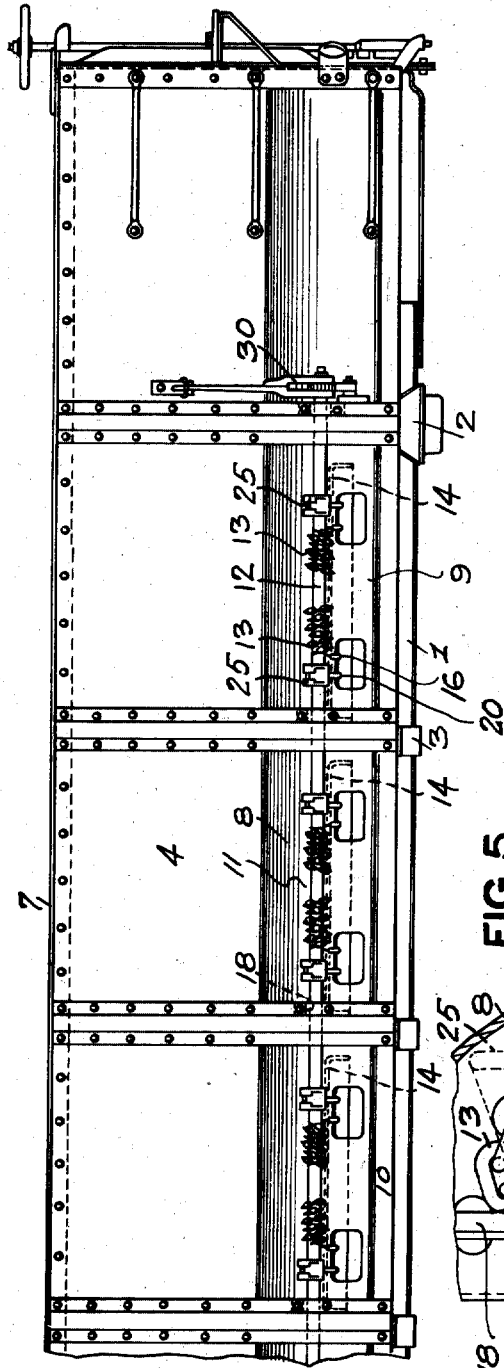
Figure 2:
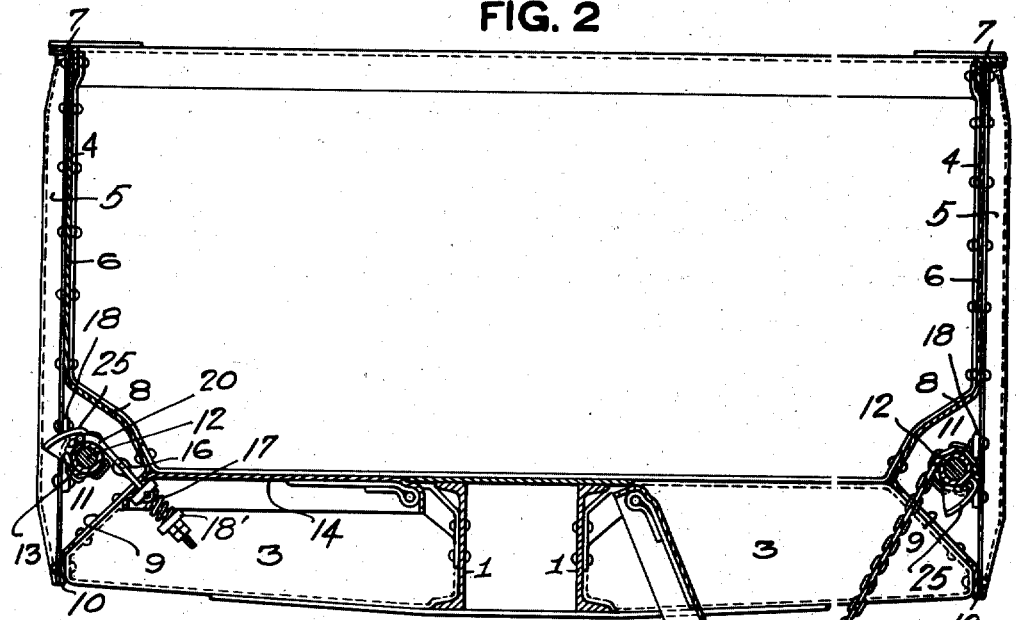
Figure 4:
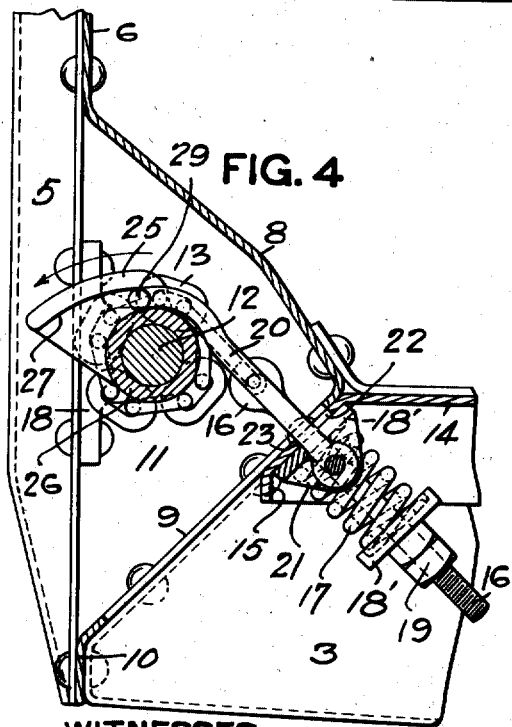
Figure 3:
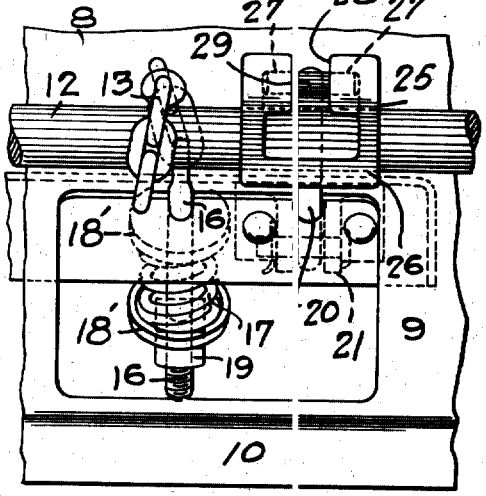

In the accompanying drawing Figure 1 is a side view of a car having the invention applied thereto; Fig. 2 is a cross section of a car; Fig. 3 is an enlarged side view of the invention; Figs. 4 and 5 are enlarged cross sections illustrating the parts in different positions; and Figs. 6 and 7 are perspective views of the preferred form of cam block and bar.

The invention is illustrated in connection with a combined freight and dump car, that is, a car having a suitable flat floor and vertical sides and provided with swinging doors extending out to the sides. It is also shown in connection with the car body forming the subject matter of a companion application of even date herewith, Serial No. 558,032, in which the pocket for the rotating chain shaft is formed by bending the bottom portion of the plate forming the car side inwardly from the vertical stiffener or stake and then outwardly to the same, forming an exposed pocket on the outside of the car in which the door closing mechanism is protected from blows by passing trains and the like by means of the side stakes, thus giving free access to the door operating mechanism from the side of the car. The door operating mechanism forming the subject matter of this application is especially adapted for use within such pocket and will be described in connection with the same, though of course it can be employed in connection with any suitable car door, and may be supported in any suitable way.

The car body is illustrated as the center sills 1, the bolsters 2, transoms 3, car sides 4, as well as the other elements necessary to form the car body. The car sides 4 as illustrated are of plate girder form, having the side plates 6 and vertical stiffeners or stakes 5 and usual top chord 7. To form a pocket for the reception of the winding shaft, and also to form the bottom chord of the plate girder side the bottom of the plate girder is bent inwardly at a downward incline as at 8, and then again bent outwardly at a downward incline as at 9, its base being bent downwardly in line with the upper part of the plate as at 10, thus forming the triangular pocket 11 to receive the winding or chain shaft 12. The winding or chain shaft 12 is rotatably mounted in this pocket so as to be laterally immovable relative to the car body, being shown as journaled in brackets 13 riveted to the stakes 5, and it is connected by suitable flexible connecting means, such as by the chain 13, to the car door 14, the door being shown as hinged at or near the center sill. The car door 14 is preferably provided with the flange 15 extending around it and the chain 13 is shown as connected to an eye-bolt 16 passing through said flange 15 and having a yielding mounting on the door, the eye-bolt passing through the spring 17 confined around said bolt by the plate 18' held by the nuts 19. This gives a yielding connection between the door and the chain adapted to take up any slack, and in a series of doors as illustrated in the drawing providing for the bringing of all of the doors to practically seat even though the chains may differ somewhat in length. As, however, such spring connection will not hold the doors positively closed I provide positive door closing means by a short connection between the winding shaft and the door proper so that as the door is brought to closing position as the shaft is rotated it will engage directly with the door and so hold it closed independent of the chain connection.

The preferred form of apparatus for this purpose consists of a bar 20 which as shown in Figs. 4 and 5, is pivoted in the bearing or bracket 21 secured to the inclined flange 15 of the door. This bar 20 extends through the slot 22 in the flange 15 and in its normal position rests against the shoulder 23 of said flange, the bar thus having a limited vertical swing but being normally held in such position that when the door is almost closed the hooking or cam block 25 will engage with the bar and as the chain shaft 12 is rotated will through the bar draw the door to closed position. The cam blocks 25 are secured upon the chain shaft in proper relation to the general position of the door so that as the bar 20 is raised with the door through the chain up to the position illustrated in Fig. 5, within the swing of the cam blocks, they will engage therewith, and in the further movement of the shaft the doors are brought to positive closed position through the connection between said bars and cam blocks, and as the cam locks are all secured to the shaft in like position I am enabled to bring all the doors to positive closed position and hold them through the locking of the chain shaft. While the cam may be of any suitable construction I prefer that illustrated in the drawing, namely, a hollow cam block 25 having a collar 26 secured firmly upon the chain shaft and having the interior cam faces 27 with the slot 28 between them. The bar 20 has at its upper end the T-head 29 which enters the slot 28 and engages the interior cam faces 27 and first raises the block 25 as the shaft is rotated in the direction illustrated by arrows in Figs. 4 and 5, and then carries the cam block upwardly so as to draw it around into the position illustrated in Fig. 4, and thus positively lock the car door to the winding shaft by a short unyielding bar-connection which provides the positive locking of the door itself and sustains the entire strain to hold the door closed. As above stated all the doors operated by the shaft have this same direct connection between the door and shaft and the special cam blocks can be secured positively in line upon the shaft so that even though the winding chains may be of different lengths as sometimes occurs on account of the yielding of the chains on their connections, by the hooking or engagement between the cam lock and bar I am enabled to bring all the doors to positive locked position no matter what the yield of the chains may be. In doing this, if any special strain is brought upon any one of the chains connecting the doors with the chain shaft the spring 17 will yield and thus permit the further winding of the chain until a positive lock between the chain shaft and door is made as above described. The chain shaft can of course be locked in closed position in any suitable way, that illustrated being by means of the ratchet lever 30.

When it is desired to dump the car, through the operation of the chain lever in the usual way the chain shaft may be freed to permit the doors to drop. In this case as the chain shaft rotates in the opposite direction to that in closing the cam block and in such way as to free the connection between it and the bar 20 is leaves the door free to be carried down of its own weight or the weight of the load except as limited by the chain itself.

What I claim is:

1. In car door operating mechanism, the combination of a car body, a hinged door, a winding shaft mounted on the car body and connected to the door, a bar carried by the door, and a rotating eccentric secured to the shaft and engaging said bar to hold the door in closed position.

2. In car door operating mechanism, the combination of a car body, a hinged door, a winding shaft connected to the door, an independent bar carried by the door and a cam block secured upon the winding shaft and engaging with said bar and adapted to hold the door in closed position.

3. In car door operating mechanism, the combination of a car body, a hinged door, a winding shaft connected to the door, a bar mounted on the door, and a hollow cam block secured to the winding shaft and having an interior cam face adapted to engage with the bar and hold the door in closed position.

4. In car door operating mechanism, the combination of a car body, a hinged door, a winding shaft connected to the door, a bar mounted on the door and having a T-head, and a hollow cam block secured on the shaft and having interior cam faces and an open slot between them adapted to engage with the T-headed bar.

5. In car door operating mechanism, the combination of a car body, a hinged car door, a winding shaft connected to the door, a bar pivotally mounted on the door and adapted to swing vertically, and a hooking or like means engaging with said bar to positively lock it to the chain shaft.

In testimony whereof, I the said JOHN M. HANSEN, have hereunto set my hand.

JOHN M. HANSEN.

Witnesses:
ROBERT C. TOTTEN,
JOHN F. WILL.

Copies of this patent may be obtained for five cents each, by addressing the "Commissioner of Patents, Washington, D. C."